United States Patent
Desjardins

(10) Patent No.: US 9,840,987 B2
(45) Date of Patent: Dec. 12, 2017

(54) AIR INDUCTION DUCT WITH INTEGRATED HYDROCARBON ADSORBER

(71) Applicant: Mann+Hummel GMBH, Ludwigsburg (DE)

(72) Inventor: Michael Desjardins, Willow Spring, NC (US)

(73) Assignee: MANN+HUMMEL GMBH, Ludwigsburg (DE)

(*) Notice: Subject to any disclaimer, the term of this patent is extended or adjusted under 35 U.S.C. 154(b) by 91 days.

(21) Appl. No.: 14/707,446

(22) Filed: May 8, 2015

(65) Prior Publication Data

US 2016/0326994 A1 Nov. 10, 2016

(51) Int. Cl.
| | | |
|---|---|---|
| *F02M 35/024* | (2006.01) | |
| *F02M 35/02* | (2006.01) | |
| *B01D 53/04* | (2006.01) | |
| *F02M 35/10* | (2006.01) | |

(52) U.S. Cl.
CPC ... *F02M 35/02491* (2013.01); *B01D 53/0415* (2013.01); *F02M 35/0218* (2013.01); *B01D 2257/702* (2013.01); *B01D 2258/06* (2013.01); *B01D 2259/4566* (2013.01); *F02M 35/1036* (2013.01); *F02M 35/10321* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,494,497 A | * | 2/1996 | Lee | B01D 46/0006 123/198 E |
| 6,623,350 B2 | * | 9/2003 | Goupil, Jr. | B60H 3/0616 454/158 |
| 9,278,475 B1 | * | 3/2016 | Khami | B29C 49/20 |
| 2008/0028938 A1 | * | 2/2008 | Li | F02M 35/024 96/134 |
| 2008/0207111 A1 | * | 8/2008 | Stroehla | B60H 1/00564 454/262 |

* cited by examiner

Primary Examiner — Joseph Dallo
Assistant Examiner — Kurt Liethen
(74) Attorney, Agent, or Firm — James Hasselbeck

(57) ABSTRACT

An air duct for an air induction system of a combustion engine. The air duct includes an air duct, a frame and a hydrocarbon adsorbing member. The air duct housing including a first end and a second end. A fluid path extends between the first and second ends. The frame is disposed in the fluid path. The hydrocarbon adsorbing member is generally planar and is retained within the frame such that first and second opposing planar sides of the hydrocarbon adsorbing member are exposed to the fluid path. The housing may include a first portion carrying the frame. The hydrocarbon adsorbing element may be retained within the frame by a second portion of the housing.

9 Claims, 2 Drawing Sheets

AIR INDUCTION DUCT WITH INTEGRATED HYDROCARBON ADSORBER

FIELD

The present teachings generally relate to the control of hydrocarbon emissions from a motor vehicle. More particularly, the present teachings relate to an air duct of an air induction system with an integrated hydrocarbon adsorber and a method of adsorbing hydrocarbons within an air duct.

BACKGROUND

This section provides background information related to the present disclosure which is not necessarily prior art.

Air induction systems are used in motor vehicles and for other applications to transport intake air from the environment to an engine for combustion. A combustion engine continuously draws air through the air induction system and into the combustion chamber during operation. When the engine shuts down, or otherwise ceases operating, air may flow in the reverse direction, into the air induction system and the environment from the combustion chamber or other portions of the engine. Air that flows from the engine into the air induction system may include hydrocarbon vapors formed by the evaporation or vaporization of un-combusted fuel. These vapors may leak into atmosphere, pollute the environment and raise the emissions of the vehicle.

Government regulations require that the amount of hydrocarbons in the air that flows from the engine and into the atmosphere be minimized. It is generally known to incorporate a hydrocarbon adsorber within the air induction system for reducing the hydrocarbons released to the environment. In this regard, the hydrocarbon adsorber can adsorb hydrocarbons that might otherwise be released into the atmosphere from the engine after engine shutdown.

While known hydrocarbon adsorbers have proven to be acceptable for their intended purposes, a continuous need for improvement in the relevant art remains.

SUMMARY

This section provides a general summary of the disclosure, and is not a comprehensive disclosure of its full scope or all of its features.

In accordance with one particular aspect, the present teachings provide an air duct for an air induction system of a combustion engine. The air duct includes an air duct housing, a frame and a hydrocarbon adsorbing member. The air duct housing includes a first end and a second end. A fluid path extends between the first and second ends. The frame is disposed in the fluid path. The hydrocarbon adsorbing member is generally planar and retained within the frame such that first and second opposing planar sides of the hydrocarbon adsorbing member are exposed to the fluid path.

In accordance with another particular aspect, the present teachings provide an air duct for an air induction system of a motor vehicle. The air induction duct includes a first housing element and a second housing element. The second housing element cooperates with the first housing element to define an air duct housing having a first end, a second end, and a fluid path extending between the first and second ends. A frame extends from the first housing element and is disposed in the fluid path. A hydrocarbon adsorbing member is retained within the frame by the second housing element.

In accordance with still yet another particular aspect, the present teachings provide a method of adsorbing hydrocarbons within an air induction system of a combustion engine. The method includes providing a first housing element carrying a frame having an open end. The method additionally includes passing a hydrocarbon adsorbing member through the open end of the frame and securing a second housing member to the first housing member to define an air duct housing having a first end, a second end, and a fluid path extending between the first and second ends. Securing the second housing member to the first housing member includes blocking the open end of the frame to retain the hydrocarbon adsorbing member within the frame. The method further includes adsorbing hydrocarbons with the hydrocarbon adsorbing member when the combustion engine is shut down.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
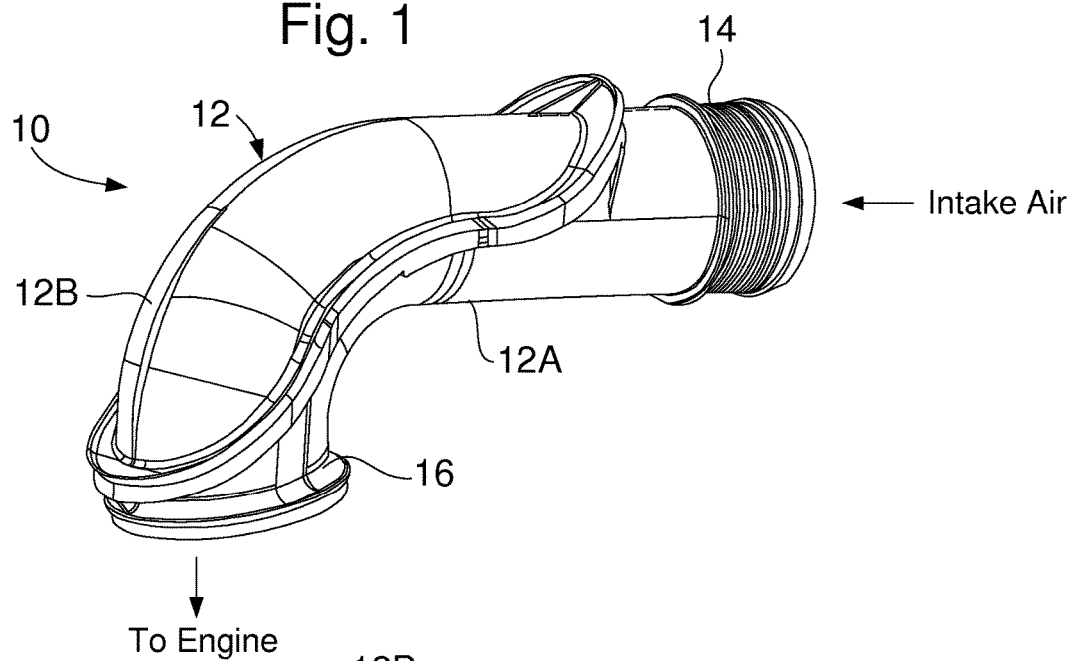
FIG. 1 is a perspective view of a duct of an air induction system of a motor vehicle constructed in accordance with the teachings of the present invention.

Example embodiment(s) will now be described more fully with reference to the accompanying drawings. Within each view, the various elements will be understood to be drawn to scale.

With general reference to the drawings, a duct of an air induction system constructed in accordance with the teachings of the present invention is illustrated and generally identified at reference character 10. In the embodiment illustrated throughout the drawings, the air duct 10 is particularly adapted for delivering a source of intake air to an internal combustion engine. More particularly, the air duct 10 is adapted for delivering a source of intake air to an internal combustion engine of a motor vehicle. It will be appreciated, however, that the scope of the present teachings are not so limited and may be adapted for other use in which the adsorption of hydrocarbons is desired.

The air duct 10 is shown to generally include a housing 12. While the housing 12 may be constructed of a single, unitarily formed housing element, the housing 12 is preferably formed of a plurality of housing elements formed separately from one another. In the embodiment illustrated, the housing 12 is formed from a first housing element 12A and a second housing element 12B. The housing elements 12A and 12B may be injection molded or otherwise suitably formed. The first and second housing elements 12A and 12B cooperate to define the air duct housing 12 which includes a first end 14, a second end 16 and a fluid path 18 extending between the first and second end 14 and 16. The second housing element 12B may be removably or permanently secured to the first housing element 12A in any manner well known in the art. In the particular embodiment illustrated throughout the drawings, the first housing element 12A may be removably secured or alternate permanently secured by welding or an adhesive onto the second housing element 12B.

Figure 2:
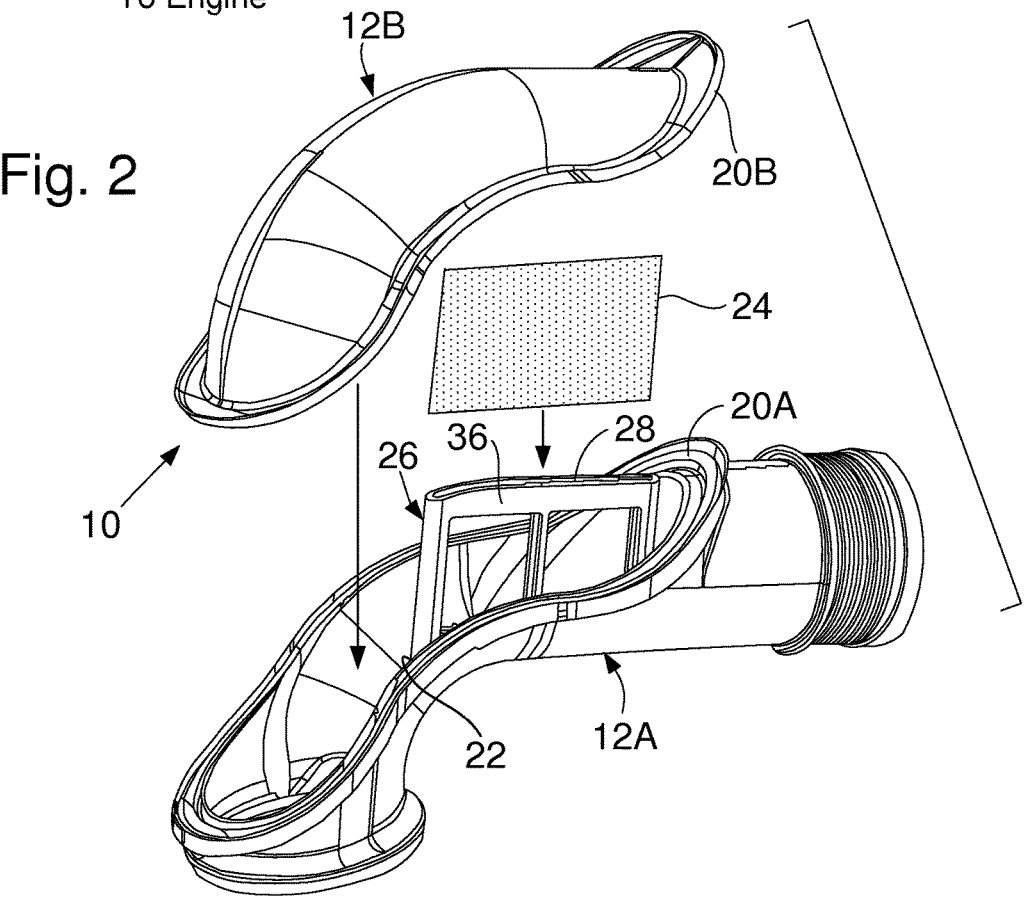
FIG. 2 is an exploded view of the air duct of FIG. 1.
Figure 3:
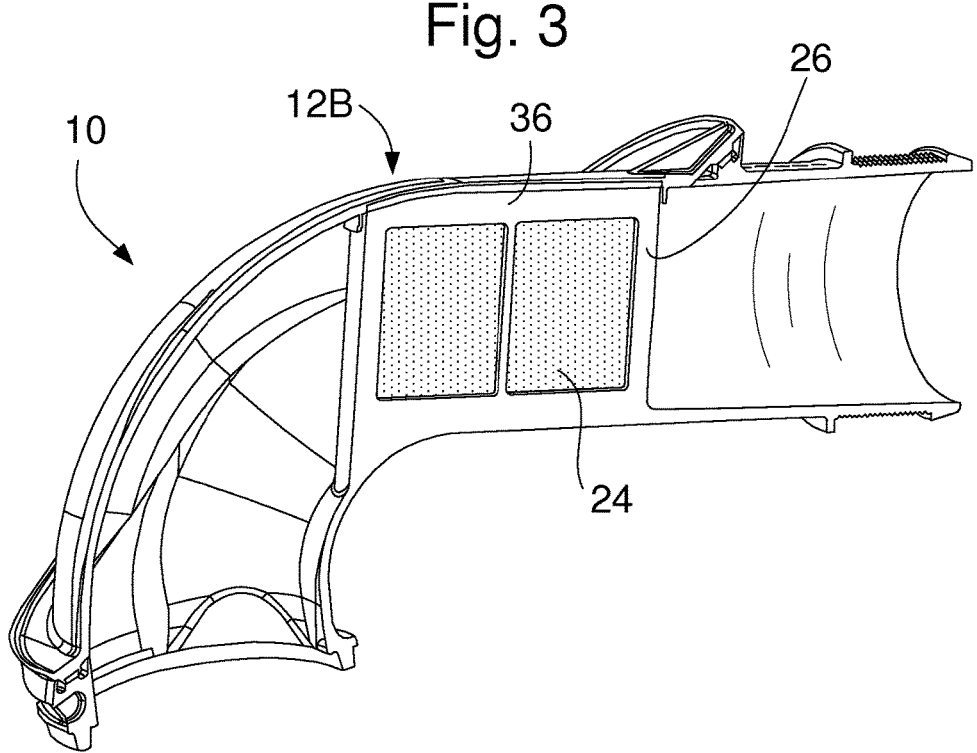
FIG. 3 is a cut-away perspective view of the air duct of FIG. 1.

As shown throughout the drawings, the first and second air duct or housing elements 12A and 12B may include respective mounting flanges 20A and 20B. The mounting flanges 20A and 20B mate and cooperate with one another to facilitate attachment of the housing elements 12A and 12B. Further in the embodiment illustrated, the first housing element 12A is generally cylindrical proximate the first end 14 of the housing 12 and generally cylindrical proximate the second end 16 of the housing. The first end 14 is oriented generally perpendicular to the second end 16. At the first and second ends 14 and 16, the housing may be secured to other components of an air induction system (not particularly shown) in any manner well known in the art. As perhaps best shown in the exploded view of FIG. 2, the first housing element 12A is open at an upper side 22 thereof. This opening 22, which is closed by the second housing element 12B, is surrounding by the mounting flange 20A. As shown in FIGS. 1 and 2, the air duct or housing 10 is a circumferentially split air duct 10 or housing formed of two halves, i.e. upper 12B and lower 12A housing elements in which the second housing element 12B extends between the first end 14 and the second end 16 formed by the housing element 12A and closes the open upper side 22 of the first housing element 12A to circumferentially close the air duct or housing 10. While the air duct 10 of the exemplary embodiment defines a right angle, it will be understood that the present teachings may be readily incorporated into a straight air duct or an air duct of any other shape.

The air duct 10 additionally includes a hydrocarbon adsorbing member 24 for adsorbing hydrocarbons. In the embodiment illustrated, the hydrocarbon adsorbing member 24 includes one or more sheets or planar elements which collective define first and second opposing planar sides. The hydrocarbon adsorbing member 24 may be generally rectangular in shape or of any other suitable, alternative shape for sufficiently adsorbing hydrocarbons when the combustion engine is shut down. In one application, the media used for construction of the hydrocarbon adsorbing member 24 may be one or two layer of a paper or alternately a non-woven fabric material having a hydrocarbon adsorbing material arranged therein or adhesively secured thereto.

The air duct 10 further includes a frame 26 for retaining the hydrocarbon adsorbing member 24 in the housing 12. As shown, the frame 26 is particularly adapted to retain the hydrocarbon adsorbing member 24 within the housing 12 such that the first and second opposing planar sides of the hydrocarbon adsorbing member 24 are exposed to the fluid path 18 extending through the housing 12. The frame 26 may be carried by one of the first and second housing elements 12A and 12B. In the embodiment illustrated, the frame 26 is carried by the first housing element 12A. In other applications, it is possible to define a first portion of the frame which is carried by the first housing element 12A and a second portion of the frame which is carried by the second housing element 12B. Further in the embodiment illustrated, the frame 26 may be integrally formed with the first housing element 12A and thereby permanently attached to the first housing element 12A.

Figure 4:
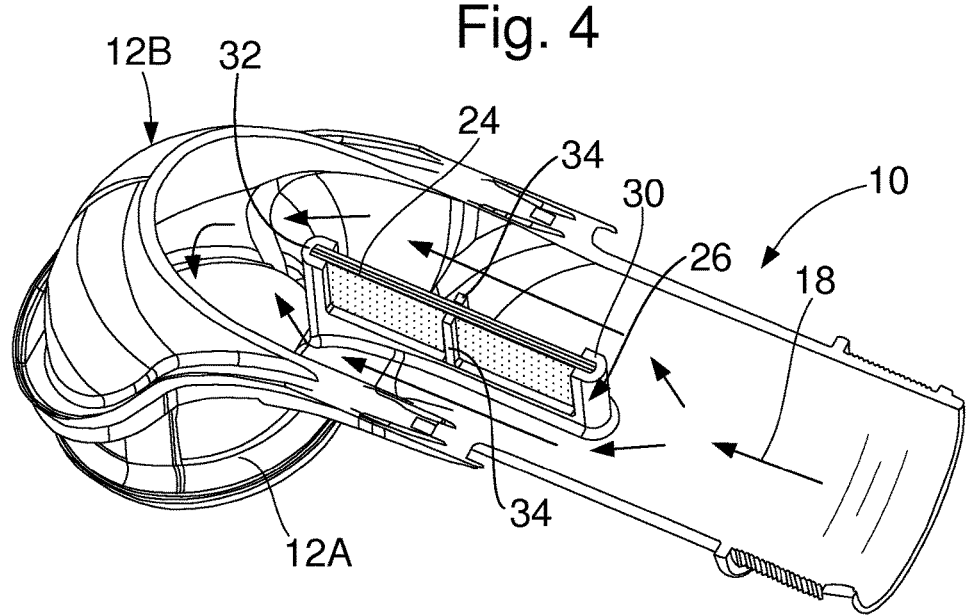
FIG. 4 is another cut-away view of the air duct of FIG. 1.

The frame 26 may correspond generally to the shape of the hydrocarbon adsorbing member 24 and therefore may be generally rectangular. The frame 26 may include an open end 28 for receiving the hydrocarbon adsorbing member 24. In the embodiment illustrated, the frame 26 includes a first end 30 and a second end 32. The first and second ends 30 and 32 may be C-shaped to define a slot for receiving the hydrocarbon adsorbing member 24. Outer surfaces of the first and second ends 30 and 32 may be rounded to facilitate the flow of air around the frame 26, as shown by the arrows in FIG. 4. The frame 26 may further include a pair of central posts 34. The first and second ends 30 and 32 and the central posts 34 may be connected by a header 36. When the second housing element 12B is secured to the first housing element 12A, the second housing element 12B may close the opening in the frame 26 and thereby retain the hydrocarbon adsorbing member 24 with the frame 26. It will be understood that the frame 26 may comprise any suitable structure for retaining the hydrocarbon adsorbing member 24 within the housing to adsorb hydrocarbons.

When the combustion engine is running, intake air is drawn through the air duct 10 along the fluid path 18. Air flow along the fluid path transitions at a transition point from flow in a first direction (e.g., perpendicular to the first end 14 of the housing 12) to a second direction (e.g., perpendicular to the second end 16 of the housing 12). The first direction is generally perpendicular to the second direction. Again, the direction of flow along the fluid path 18 is shown by the arrows in FIG. 4. When the engine is shut off, air may flow in an opposite direction. This flow in the opposite direction may include hydrocarbon vapors formed by the evaporation or vaporization of un-combusted fuel. The hydrocarbon adsorbing member 24 adsorbs hydrocarbons from this flow.

It will now be appreciated that the present teachings provide a way to incorporate media into the clean side of an air induction system that will adsorb these vapors until the engine is restarted. Furthermore, the present teachings allow for effective adsorption of hydrocarbons without negatively affecting the performance of the engine.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An air duct for an air induction system of a combustion engine, the air duct comprising:
   a first end of the air duct receiving intake air into the air duct;
   a second end of the air duct discharging intake air from the air duct;
   a fluid path extending between the first and second ends;
   wherein the air duct is a circumferentially split tubular air duct, circumferentially split between the first end and the second end;
   the air duct further comprising:
      a first air duct element forming a lower tubular portion of the circumferentially split air duct, the first air duct element forming the first end and forming the second end of the air duct,
      wherein the first air duct is circumferentially open on an open upper side of the air duct, the open upper side of the air duct elongated between and extending between the first end and the second end;
      a second duct element forming an upper tubular portion of the circumferentially split tubular air duct,
      wherein the second air duct element extends between the first end and the second end formed by the first air duct element and closes the upper side of the first air duct element to circumferentially close the air duct;
   toward the open upper side of the first air duct element, the frame comprising:
      a frame integral with the first air duct element, the frame having a first end arranged within an interior of the first air duct element, the frame projecting outwardly from the first end of the frame through the open upper side of the first air duct element and then continuing outwardly away from the first air duct element to an open end of the frame arranged outside of the first air duct element, the frame comprising:
         open end facing and closed off by the second air duct element;
         a first end post arranged at an upstream end of the frame, the first end post projecting outwardly through the open upper side of the first air duct element;
         a second end post arranged at an downstream end of the frame, the second end post projecting outwardly through the open upper side of the first air duct element;
         a central post arranged between the first end post and the second end post, the second end post projecting outwardly through the open upper side of the first air duct element;
         wherein the first and second end posts are C-shaped, each forming a slot;
      a flat planar hydrocarbon adsorbing member is received into the frame through the open end of the frame and received into the slot of the first and second end posts;
      wherein the flat planar hydrocarbon adsorbing member is supported against the central post.

2. The air duct for an air induction system of claim 1, wherein
   the first air duct element is formed separately from and attached to the second air duct element,
   the frame is integrally formed with the first air duct element.

3. The air duct for an air induction system of claim 1, wherein
   the second housing element closes the open end of the frame when the second air duct element is secured to the first air duct element to thereby retain the planar hydrocarbon adsorbing member within the frame.

4. The air duct for an air induction system of claim 1, wherein
   the frame is disposed in the fluid path such that first and second opposing planar sides of the planar hydrocarbon adsorbing member are disposed parallel to a flow of intake air along the fluid path.

5. The air duct for an air induction system of claim 1, wherein the frame bisects a portion of the air duct.

6. The air duct for an air induction system of claim 1, wherein
   the first end of the air duct is disposed perpendicular to the second end of the air duct.

7. The air duct for an air induction system of claim 1, wherein
   air flow along the fluid path transitions from flow in a first direction to flow in a second direction at a transition,
   the first direction being generally parallel to the second direction,
   the frame disposed proximate to the transition.

8. The air duct for an air induction system of claim 1, wherein
   the first end post of the frame having an outer surface facing first end of the air duct, the outer surface rounded to facilitate a flow of intake air around the frame.

9. The air duct for an air induction system of claim 1, wherein
   the frame further includes
      a central post arranged between the first end post and the second end post, the second end post projecting outwardly toward the open upper side of the first air duct element;
      wherein the flat planar hydrocarbon adsorbing member is supported against the central post.

* * * * *